United States Patent [19]

McKay

[11] 3,918,328
[45] Nov. 11, 1975

[54] AXLE GEAR DRIVE
[76] Inventor: Randolph McKay, 3316 N. Damen Ave., Chicago, Ill. 60618
[22] Filed: July 19, 1973
[21] Appl. No.: 380,902

[52] U.S. Cl. .............................. 74/665 F; 74/665 T
[51] Int. Cl.² ......................................... F16H 37/06
[58] Field of Search ............ 74/799, 800, 715, 710, 74/423, 713, 714, 665 S, 665 T, 665 P, 417, 710.5, 60, 461; 64/8, 7

[56] References Cited
UNITED STATES PATENTS
| 1,128,429 | 2/1915 | Fetzer | 74/710.5 |
| 1,866,656 | 7/1932 | Ledwinka | 74/713 |
| 3,554,055 | 1/1971 | Galaniuk | 74/713 |

FOREIGN PATENTS OR APPLICATIONS
| 316,777 | 3/1915 | Germany | 74/710 |

Primary Examiner—Samuel Scott
Assistant Examiner—Frank H. McKenzie, Jr.
Attorney, Agent, or Firm—Hill, Gross, Simpson, Van Santen, Steadman, Chiara & Simpson

[57] ABSTRACT

A nondifferentiating rear axle gear for vehicles which includes a cylindrical driving gear attached to the drive shaft of the vehicle which meshes with two side gears, each non-rotatably attached to independent axles. One side gear is driven at one end of the cylindrical gear, and the other side gear is driven at the other end of the cylindrical gear. The side gears being angled with respect to the axis of the cylindrical gear.

1 Claim, 3 Drawing Figures

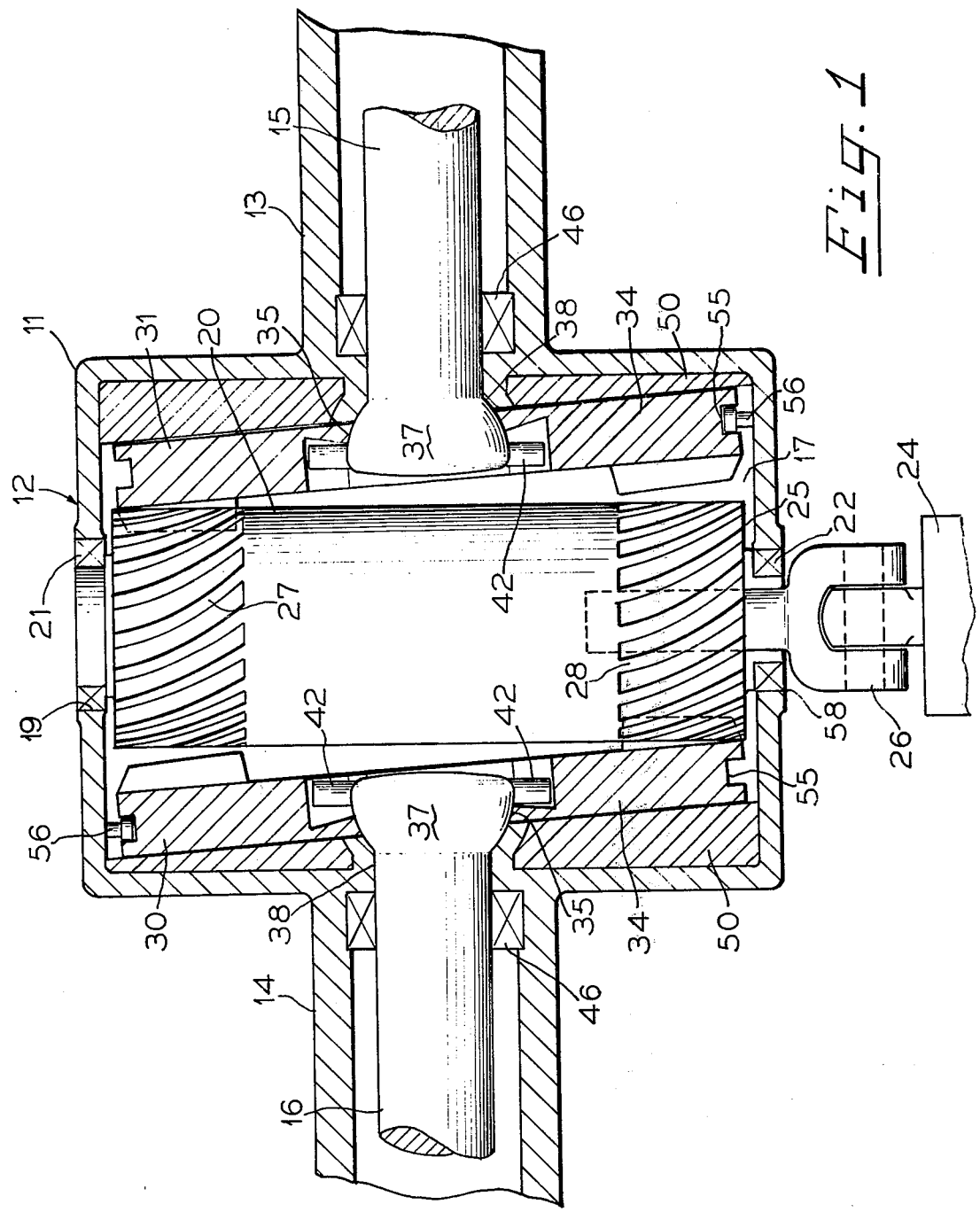

AXLE GEAR DRIVE

BACKGROUND OF THE INVENTION

1. Field of the Invention

This invention relates to vehicles, and more particularly to an axle gear drive for vehicles.

2. Prior Art

Normally the driving axle rods of a vehicle are driven through a differential allowing independent rotation of the driving wheels of the vehicle. However, a certain class of vehicles, such as dragsters, perform better when the driving wheels, normally the rear wheels, are nondifferentiating. It is therefore desirable to provide a direct gear train to the driving wheels. However, it is also desirable to provide independent axles to the driving or rear wheels. To this end, it is desirable to provide a gear train having a great degree of simplicity for driving the rear axles. However, since the drive shaft rotates in one direction and lies in a plane normal to the plane of the rear axles, it has normally heretofore been necessary to provide multiple gear sets in direct drive rear axle connections.

SUMMARY

This invention overcomes the disadvantages in the prior art and provides a simple gear drive system where the drive shaft is attached to a single gear element, which in turn drives side gears non-rotatably affixed to the axles. The gear element is preferably a cylinder having gear bands adjacent either end. In this manner, one of the gear bands is forward on the cylinder, and the other gear band is to the rear on the cylinder with the cylinder aligned axially of the drive shaft. One of the side gears contacts the cylinder at the forward gear band, and the other side gear contacts the cylinder at the rear side band. The ring gears are of equal diameter and are angled with respect to the cylindrical gear element with the teeth of the side gear raised from the body thereof. In this manner, the teeth may mesh at one end of the cylindrical gear element while being spaced radially of the cylindrical gear element at the other end. The side gears are preferably received on a housing and are backed by inclined bearing members to aid in maintaining the side gear in engagement.

This invention also discloses a special connection for connecting the axles to the side gears, which allows the ring gears to wobble to maintain their angularity to the cylindrical gear element.

It is therefore an object of this invention to provide a nondifferentiating axle gear drive.

It is a more important object of this invention to provide a rear axle gear drive for vehicles which is nondifferentiating and which employs a single cylindrical gear element for driving independent rear axles.

It is another more important object of this invention to provide a nondifferentiating gear assembly employing side gears driven by a cylindrical gear element at opposite ends of the cylindrical gear element, the side gears being angled with respect to the axis of the cylindrical gear element.

It is yet another and more specific object of this invention to provide a rear axle gear drive employing a cylindrical driving gear element attached to the drive shaft of the vehicle, driving side gears disposed at an angle to the axis thereof, one of the side gears being driven from a front portion of the cylindrical gear element and the other of the side gears being driven from a rear portion of the cylindrical gear element, the side gears being non-rotatably attached to independent driven axles through a wobble connection.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

FIG. 1 is a fragmentary cross-sectional horizontal view of a housing and a gear train assembly for driving independent rear axles from a drive shaft;

DESCRIPTION OF THE PREFERRED EMBODIMENT

Figure 3:
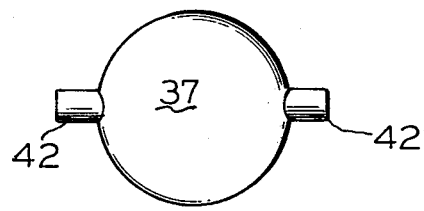
FIG. 3 is an end plan view of an axle end for indexing with the side gear of FIG. 2.

FIG. 1 illustrates a gear train and an axle housing such as rear axle housing 11 consisting of a gear train housing portion 12 and hollow axle housings 13 and 14. The hollow axle housings 13 and 14 receive axle rods 15 and 16, which project into the interior of the gear train housing 12.

The gear train housing 12 has a hollow interior 17 with an opening 18 in the front end thereof to the interior and, if desired, an opening 19 in the rear. A cylindrical gear member 20 is suspended in the housing between the openings and may be suspended in bearing assemblies 21 and 22 in the openings, if desired. Seal devices, (not illustrated) may protect the openings to prevent entrance of dirt thereto. A drive shaft 24 is attached to the front end 25 of the cylindrical gear member 20 through a universal joint 26. The cylindrical gear member 20 has gear teeth bands 27 and 28 adjacent respectively the rear end and the front end of the cylindrical gear member interior of the housing 12.

Figure 2:
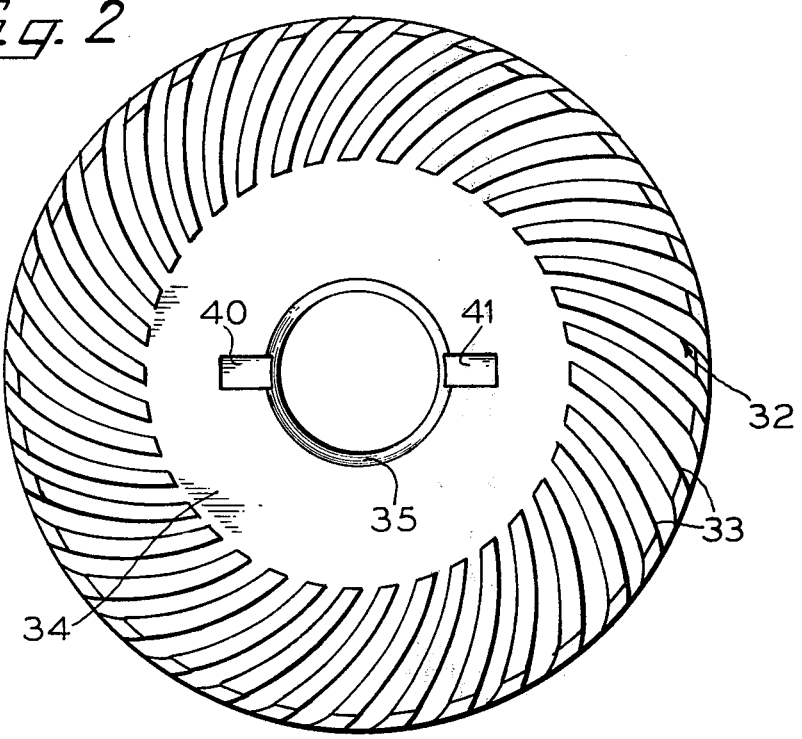
FIG. 2 is a face plan view of a side gear.

It is the desire of this invention to drive the axles 15 and 16 simultaneously from the drive shaft driven gear member without the provision of intervening gear assemblies. To this end, two side gears 30 and 31 are attached respectively to the axles 15 and 16, and contact opposite ends of the cylindrical gear member 20. The side gears, best illustrated in FIGS. 1 and 2, have peripheral tooth bands 32 with helix teeth 33 thereon. The bands of teeth are raised from a disk portion 34, which has a central aperture 35 therein.

Enlarged head portions 37 of the axles 15 and 16 project through contoured openings 38, communicating the axle housing 14 to the interior of the gear housing 12. The head portions extend through the openings 35 of the side gears 30 and 31. The enlarged heads terminate in portions which are larger than the openings 35, so as to be non-removable from the side gears at the head ends.

The side gear is free to wobble on the ends of the axle rods 15 and 16 and has recesses 40 and 41 extending radially outwardly from the aperture 35. The recesses index with projections 42 extending radially from the enlarged head of the axle rods 15 and 16, the projections contacting the side walls of the recesses to rotate the axle rods with the side gears while allowing wobbling of the side gears on the ends of the axle rods. The axle rods may be supported by bearings as at 46 received in the axle housings 13 and 14 adjacent the gear housing 12.

As illustrated in FIG. 1, the side gears 30 and 31 are maintained at an angle to the axis of the cylindrical gear member 20. The side gears are backed by bearing plates 50, which are wedge-shaped to maintain the side gears at the proper angle. A spherical bearing surface is provided between the inner diameter of the side gear and the rod end which will cooperate with the wedge-shaped bearing plate to maintain the proper angularity of the side gear with respect to the cylinder gear member. As a further aid in maintaining the angle of the side gears, they may have outer diameter channels 55 which receive bearing pins 56 attached to the front and rear walls of the housing 12 to aid in maintaining the side gears at the proper angle to the axis of the cylindrical gear member. The side gears are maintained such that they will contact and mesh with the gear teeth at one end of the cylindrical gear member, but be out of contact with the gear teeth at the other end. In this manner, one side gear is driven off of the gear band 28, while one side gear is driven off of the gear band 27. By driving the opposed side gears off of opposite ends of the cylindrical gear member, both ring gears will be rotated in the same direction, although lying on opposite sides of the cylindrical gear member. By maintaining the angle of the side gears, contact with the other end of the cylindrical gear member is prevented.

In this manner, the side gears are directly opposed from one another, allowing the shafts to be co-axial and to be driven from a single cylindrical gear member without the necessity of intervening gears such as idler gears.

Further, because of the driving of the side gears from opposed ends of the cylindrical gear member on opposite sides of the cylindrical gear, it is easier to balance the driving torque through the cylindrical gear member in that the sideways pressure created by the gear contact is maintained in a single direction.

The bearing plates 50 are wedge-shaped, and may be constructed of a low friction bearing material.

It can therefore be seen from the above that my invention provides for a nondifferentiating independent axle drive gear assembly, utilizing a cylindrical gear member with circumferential bands of gear teeth at opposite ends thereof, each band deriving a single side gear of a pair of opposed side gears, the side gears being attached to the ends of axle rods, the axle rods being free to pivot with respect to the axle head while being non-rotatably attached thereto. Bearing blocks may back the side gears to maintain them in an angled relationship with respect to the axis of the cylindrical gear member.

Although the teachings of my invention have herein been discussed with reference to specific theories and embodiments, and although illustrative means for accomplishing explained results have been described, it is to be understood that these are by way of illustration only and that others may wish to utilize my invention in different designs or applications.

I claim as my invention:

1. A non-differentiating gear train assembly driving the axles of a vehicle comprising: a housing, a cylindrical gear member in said housing having circumferential bands of gear teeth separated from one another positioned adjacent opposite axial ends of the cylindrical member, two side gears in said housing having axial gear teeth, said side gears driven by said cylindrical gear member, said side gears disposed on opposite sides of the cylindrical member, said side gears opposed to one another, one of said side gears driven by one of said bands and the other of said side gears driven by the other of said bands, said side gears driven in the same direction of rotation, said side gears disposed at an angle to the axis of the cylindrical gear member, fixed means carried by said housing maintaining the angulation of the side gears to the cylindrical gear member, and the side gears free to wobble on the ends of axles projecting at right angles to the cylindrical gear member, the axles attached to the side gears for rotation therewith.

* * * * *